(No Model.)

W. J. PURDY.
ROLLER MILL FEED HOPPER.

No. 400,413. Patented Mar. 26, 1889.

Witnesses:
John Grist
Wm L Magee

Inventor:
William J. Purdy
By Henry Grist
Attorney.

UNITED STATES PATENT OFFICE.

WILLIAM JETHRO PURDY, OF CARBERRY, MANITOBA, CANADA, ASSIGNOR OF ONE-HALF TO JOHN H. LYONS, OF SAME PLACE.

ROLLER-MILL FEED-HOPPER.

SPECIFICATION forming part of Letters Patent No. 400,413, dated March 26, 1889.

Application filed September 20, 1888. Serial No. 285,943. (No model.)

*To all whom it may concern:*

Be it known that I, WILLIAM JETHRO PURDY, of Carberry, in the county of Norfolk, in the Province of Manitoba, in the Dominion of Canada, have invented a certain new and useful Improvement in Roller-Mill Feed-Hoppers; and I do hereby declare that the following is a full, clear, and exact description of the same, reference being had to the accompanying drawings, in which—

Figure 1:
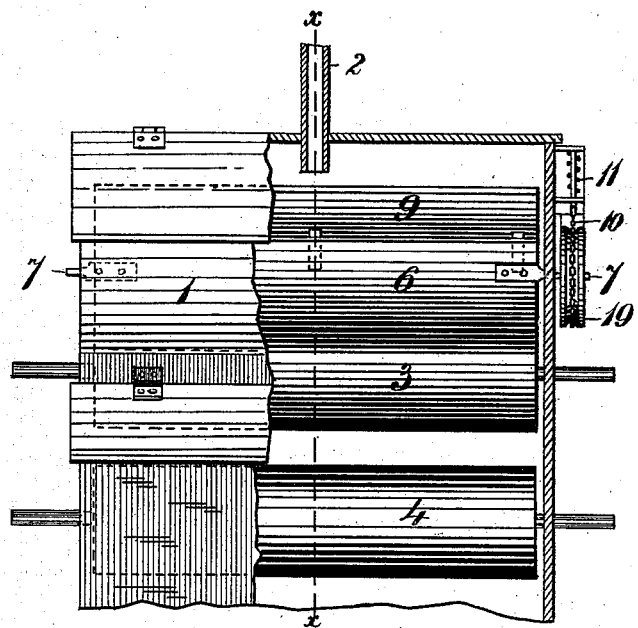
Figure 2:
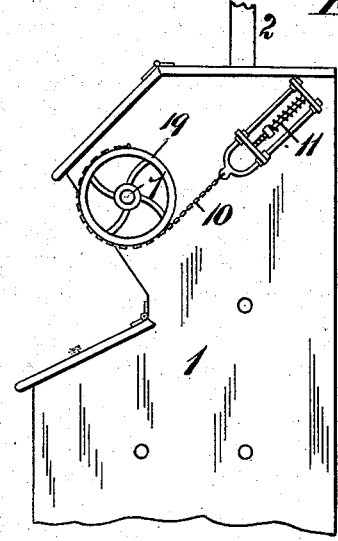
Figure 3:
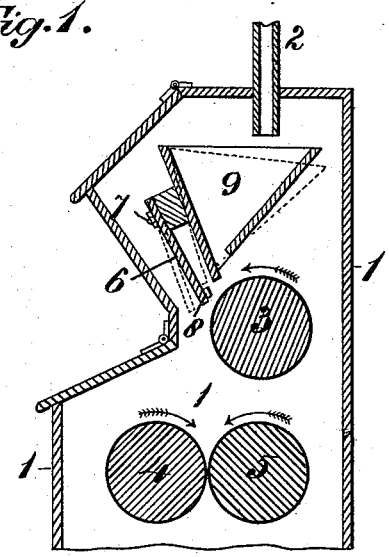

Figure 1 is a front elevation of a portion of a roller-mill, the casing partly broken away to show my improvement. Fig. 2 is an end view of the same, and Fig. 3 is a transverse vertical section on line X X, Fig. 1.

My invention has for its object to prevent overflow of the feed-hopper and choking of the feed-spouts, as well as to give an even and regular feed to the reduction-rollers automatically.

My invention consists of a hopper attached to a feed-board endwise journaled through the mill-casing, one end of the journal provided with a wheel or crank, which by a chain or cord connects with a spring having a tension-regulator, so that when the weight of grain in the hopper exceeds the tension of the spring the hopper will slightly fall and throw out the feed-board, whereby an abnormal quantity of grain will pass to the feed-roller, as hereinafter more particularly described.

1 is the mill-casing; 2, the feed-spout entering through the top of the casing; 3, the feed-roller, and 4 5 the reduction-rollers as now ordinarily in use.

6 is the feed-board journaled endwise through the casing to have a rocking motion parallel to the feed-roller. The lower edge of the feed-board stops against a block, 8, at the ends of the casing, to prevent close contact with the feed-roller.

9 is the feed-hopper within the casing, and receives the grain from the feed spout or spouts, and said hopper is attached to that side of the feed-board which is toward the feed-roller, so as to discharge grain to the feed-board and feed-roller.

One end of the journal 7, which sustains the feed-board pivotally, projects through the casing and is provided with a crank or peripherally-grooved wheel, 19, to which one end of a chain or cord, 10, is attached. The other end is attached to a spring tension-regulator, 11, secured to the outside of the casing to resist the weight of the hopper, so that when the hopper is overcharged with grain the spring will yield and the hopper fall to the position shown in dotted lines, and the lower edge of the feed-board will move away from the feed-roller to allow an increased flow of grain to the reduction and feed rollers, and when the hopper has been relieved of the surplus quantity of grain the spring will react and return the hopper and feed-board to a normal position.

I claim as my invention—

In a roller-mill, the combination, with the feed-roller 3, of a hopper, 9, connected to a feed-board, 6, endwise pivoted or journaled through the mill-casing, a wheel, 19, on said journal to rock the feed-board, and a spring tension-regulator, 11, connected to said wheel by a chain or cord, 10, whereby the hopper, when overcharged, will overcome the resistance of the spring and actuate the feed-board to allow an abnormal quantity of grain to escape to the feed and reduction rollers until the tension of the spring overcomes the gravity of the hopper, the feed-board then returning to its normal position.

WILLIAM JETHRO PURDY.

Witnesses:
WILLIAM MARKLE,
RICHARD WILLIS.